United States Patent [19]

Bost et al.

[11] 4,093,636
[45] June 6, 1978

[54] EPOXIDATION OF OLEFINIC COMPOUNDS

[75] Inventors: Pierre-Etienne Bost, Thiais; Michel Costantini, Lyons, both of France

[73] Assignee: Rhone - Poulenc Industries, Paris, France

[21] Appl. No.: 768,630

[22] Filed: Feb. 14, 1977

Related U.S. Application Data

[63] Continuation-in-part of Ser. No. 479,262, June 13, 1974, abandoned.

[30] Foreign Application Priority Data

June 14, 1973 France .................................. 73 21666

[51] Int. Cl.² .......................................... C07D 301/20
[52] U.S. Cl. ............................. 260/348.29; 260/429.7
[58] Field of Search ..................................... 260/348.29

[56] References Cited

U.S. PATENT DOCUMENTS

| | | | |
|---|---|---|---|
| 3,332,965 | 7/1967 | Fukui et al. | 260/348.5 R |
| 3,806,467 | 4/1974 | Watanabe et al. | 252/429 R |

FOREIGN PATENT DOCUMENTS

1,276,637  6/1972  United Kingdom.

*Primary Examiner*—Norma S. Milestone
*Attorney, Agent, or Firm*—Cushman, Darby & Cushman

[57] ABSTRACT

Tin catalysts are provided for epoxidizing olefinic compounds in the presence of organic hydroperoxides, in the liquid phase. These catalysts give good yields of the epoxide and of the alcohol derived from the organic hydroperoxide. They have the formula:

$$RR'SnCl_2 \qquad (I)$$

in which:

R represents a wholly aliphatic or cycloaliphatic or aromatic or mixed aliphatic/aromatic, aliphatic/cycloaliphatic or cycloaliphatic/aromatic, inter alia alkylaryl or aralkyl, linear or branched, saturated or unsaturated monovalent hydrocarbon radical, which can optionally carry substituents, such as chlorine atoms, the number of carbon atoms being at most 20, R' represents either a chlorine atom or a monovalent organic radical of the formula:

$$R''-Y \qquad (II)$$

in which:

Y represents an oxygen atom, or a (—O—O—) group, or a carbonyloxy group (—CO—O—), the radical R" being attached to the carbon atom of the (—CO—O—), R" may be identical or different to R and is as defined under R.

53 Claims, No Drawings

EPOXIDATION OF OLEFINIC COMPOUNDS

This application is a continuation-in-part application of U.S. Ser. No. 479,262 filed June 13th 1974, now abandoned.

The present invention relates to a process for the epoxidation of olefinic compounds by means of organic hydroperoxides, in the liquid phase.

It is known that the reactivity of olefinic compounds varies greatly depending upon the size and structure.

Many methods of epoxidising olefinic compounds are known. A typical industrial method is direct oxidation. However, if such a method proceeds in high yields for ethylene, it is not applicable to other olefins including the adjacent homologue propylene, which is the next most important commercial compound.

An improved method has been proposed in U.S. Pat. No. 3,332,965 (Fukui et al), wherein propylene and an oxygen-containing gas are brought into contact either in the gas phase or in the liquid phase, in the presence of an organic silicon or tin compound. This process results in a mixture of propylene oxide, acetaldehyde and acrolein, as the principal products. It is, however, a well known phenomenon in the art that during the direct oxidation of propylene an impressive variety of by-products are formed simultaneously, certain of which interfere to a considerable extent with the overall yield, by reason of their ease of reaction with the desired propylene oxide end product. Moreover, the recovery of the propylene oxide from the reaction mixture is rendered difficult by the presence in this mixture of certain by-products having similar boiling points.

Another method has been proposed in U.S. Pat. No. 3,806,467 (Watanabe et al), wherein hydrogen peroxide is used as epoxidising agent in the presence of a catalyst system comprising at least one organic tin compound having at least one hydroxyl group (or a coordination group capable of being converted to a hydroxyl group in the presence of water or hydrogen peroxide) as the first component and a second component selected from the group consisting of compounds of vanadium, molybdenum, tungsten, selenium and boron. However the reaction rate is extremely low. Moreover, hydrogen peroxide has the obvious disadvantage of non-regenerability; also the production of water causes product loss.

In British Pat. Specification No. 1,276,637 (Shell) it has been proposed to epoxidise olefinic compounds by means of organic hydroperoxides in the presence of catalysts based on tin, these tin catalysts being hydrides, hydroxides, bis-oxides or alcoholates. However the reaction proceeds giving a rather poor conversion relative to the hydroperoxide employed with a relatively low epoxide selectivity.

The best result disclosed is where a triphenyl tin hydroxide catalyst is said to give a hydroperoxide conversion of 24.8% and an epoxide selectivity of 79% (see Table 2).

These facts demonstrate the need for more effective catalysts for use in epoxidising olefinic compounds with organic hydroperoxides.

An aim of the present invention is to provide a process for preparing epoxides by reacting organic hydroperoxides with olefinic compounds, in the liquid phase, by means of catalysts based on tin with improved performance.

The process of this invention is characterised in that the catalysts based on tin are catalysts of the formula:

$$RR'SnCl_2 \qquad (I)$$

in which:
R represents a wholly aliphatic or cycloaliphatic or aromatic or mixed aliphatic/aromatic, aliphatic/cycloaliphatic or cycloaliphatic/aromatic, inter alia alkylaryl or aralkyl, linear or branched, saturated or unsaturated monovalent hydrocarbon radical, which can optionally carry substituents, such as chlorine atoms, the number of carbon atoms being at most 20,
R' represents either a chlorine atom or a monovalent organic radical of the formula:

$$R''\text{-Y} \qquad (II)$$

in which:
Y represents an oxygen atom, or a (—O—O—) group, or a carbonyloxy group (—CO—O—), the radical R" being attached to the carbon atom of the (—CO—O—),
R" may be identical or different to R and is as defined under R.

Methyl, ethyl, n-propyl, isopropyl, cyclopropyl, n-butyl, isobutyl, n-pentyl, n-hexyl, cyclohexyl, n-octyl, lauryl, chloromethyl, α-chloroethyl, α-phenylethyl; vinyl, isopropenyl, allyl, phenyl, o- and p-methylphenyl, p-chlorophenyl, p-methoxyphenyl, chlorobenzyl, α-naphthyl radicals may be mentioned more specifically as typical radicals R.

Methoxy, ethoxy, butoxy, lauryloxy; acetoxy, propylcarbonyloxy and phenylethoxy radicals may be mentioned more specifically as radicals R'.

Specific catalysts which may be used include the following (which is in no way limiting; unless otherwise indicated, the radicals or hydrocarbon chains mentioned are linear):
butyl-trichloro-tin
methyl-trichloro-tin
ethyl-trichloro-tin
phenyl-trichloro-tin
o-methylphenyl-trichloro-tin
phenylethyl-trichloro-tin
isopropyl-trichloro-tin
cyclopropyl-trichloro-tin
isobutyl-trichloro-tin
n-octyl-trichloro-tin
n-hexyl-trichloro-tin
p-methylphenyl-trichloro-tin
α-naphthyl-trichloro-tin
vinyl-trichloro-tin
isopropenyl-trichloro-tin
chloromethyl-trichloro-tin
α-chloroethyl-trichloro-tin
p-chlorophenyl-trichloro-tin
n-pentyl-trichloro-tin
p-methoxyphenyl-trichloro-tin
lauryl-trichloro-tin
p-chlorobenzyl-trichloro-tin
p-chlorophenyl-trichloro-tin
p-methoxyphenyl-trichloro-tin
cyclohexyl-trichloro-tin
propyl-trichloro-tin
pentyl-trichloro-tin
cyclopentyl-trichloro-tin
methyl-methoxy-dichloro-tin
methyl-ethoxy-dichloro-tin methyl-butoxy-dichloro-tin
methyl-lauryloxy-dichloro-tin
butyl-methoxy-dichloro-tin
butyl-ethoxy-dichloro-tin
butyl-butoxy-dichloro-tin
butyl-lauryloxy-dichloro-tin
propyl-methoxy-dichloro-tin
propyl-ethoxy-dichloro-tin
propyl-butoxy-dichloro-tin
propyl-lauryloxy-dichloro-tin
phenyl-methoxy-dichloro-tin
phenyl-butoxy-dichloro-tin
phenyl-ethoxy-dichloro-tin
octyl-methoxy-dichloro-tin
octyl-butoxy-dichloro-tin
octyl-ethoxy-dichloro-tin
cyclohexyl-methoxy-dichloro-tin
cyclohexyl-ethoxy-dichloro-tin
cyclohexyl-butoxy-dichloro-tin
methyl-acetoxy-dichloro-tin
ethyl-acetoxy-dichloro-tin
propyl-acetoxy-dichloro-tin
butyl-acetoxy-dichloro-tin
pentyl-acetoxy-dichloro-tin
hexyl-acetoxy-dichloro-tin
octyl-acetoxy-dichloro-tin
lauryl-acetoxy-dichloro-tin
butyl-dichloro-tin butyrate
$(CH_3—CHCl)SnCl_3$
$(CH_3—C_6H_4)SnCl_2(OCH_3)$
octyl-dichloro-tin butyrate
$(CH_3—C_6H_4)SnCl_2(OC_4H_9)$
$C_4H_9SnCl_2[O—CH(CH_3)—C_6H_5]$
$CH_3SnCl_2(O—CO—C_3H_7)$ Several processes for the preparation of chlorinated derivatives of tin are known and thus do not form part of the present invention. For example, reference may be made to the following:

"The Chemistry of organotin compounds" by R. C. Poller, Ed. Logos press, 1970,

"Organotin compounds," volume 1, 2 and 3, by A. K. Sawyer, Ed. Marcel Dekker, 1971, "Organometallic compounds" by Michael Dub. Ed. Springer Verlag, 1967 (volume 2) and 1973 (volume 2 - 1st. supplement), Chemical Reviews 60, 459–539 (1960).

A preferred class of new tin compounds used in the epoxidation reaction is of the formulae:

$$R (R'' O) SnCl_2 \quad (III)$$

and $$R (R'' — COO) SnCl_2 \quad (IV)$$

in which:

R and R" are as defined above and R" may be identical to or different from R. In this particular case R and R" are preferably alkyl radicals with 1 to 12 carbon atoms.

In addition to the general advantages of all the catalysts used in the process of the invention, in particular the good yields of epoxides which they make it possible to obtain, these catalysts display other advantages, particularly the reduction or elimination of the initial inhibition period which other catalysts frequently show.

These novel catalysts can be prepared by reacting a trichloro organotin of the formula R SnCl_3 with a metal alcoholate R"OM or a carboxylate R"COOM, M being a monovalent ion or (1/n) of an n-valent metal ion, for example sodium, potassium or silver, respectively, the radicals R and R" being as defined above, and R" may be identical or different to R.

The reaction takes place advantageously in suspension or in solution in a solvent for the reagents. The reagents are suitably employed in stoichiometric or close to stoichiometric proportions (i.e. up to about 20 mol % from the stoichiometric amount). The reaction temperature can generally be from 0° to 120° C.

It should be made clear that these compounds may be used in the epoxidation process of the invention in the form of crude reaction products without purification.

Another preferred class of new tin compounds used in the epoxidation process is of the formulae:

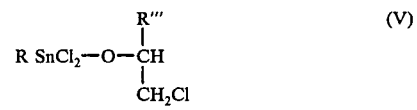

and $$R SnCl_2 — O — CH_2 — CHCl — R''' \quad (VI)$$

in which:

R has the meaning given above and R''' may be identical to or different from R.

These compounds are advantageously prepared by reacting R SnCl_3 with an epoxide of the formula:

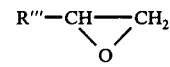

R''' being an organic monovalent radical having at most 20 carbon atoms.

The reaction suitably takes place in solution, generally at a temperature from 0° to 120° C., the reagents are preferably used in stoichiometric amounts or in amounts which are close to the stoichiometric requirement.

It should be made clear that these compounds also may be used in the epoxidation process of the invention without purification and/or in the form of mixtures of said compounds.

It should be stated that some tin derivatives can give complexes, especially with solvents; the existence of these complexes can be detected in some cases by physical methods. However, since in such complexes the valency bonds of the molecule of tin catalyst are essentially unchanged, these complexes should not be regarded as distinct catalytic entities. Naturally when reference is made to catalysts of the formula RR' SnCl_2 this should be read as including such complexes.

The olefinic compounds which can be epoxidised according to this invention are, in particular, aliphatic, arylaliphatic or alicyclic olefines which may optionally be substituted by substituents such as ester, ketone or ether groups.

The preferred olefinic compounds have approximately 2 to 30 carbon atoms, more specifically at least 3 carbon atoms. Specific examples of olefinic compounds which can be epoxidised according to the invention include ethylene, propylene, (1- and 2-) n-butenes, isobutene, isoprene, (1- and 2-) pentenes, methyl-pentenes, (1-, 2- and 3-) n-hexenes, (1- and 2-) octenes, (1- and 2-) dodecenes, cyclohexene, (1-, 3- and 4-methylcyclohexene, butadiene, styrene, α-methylstyrene, (o-, m- and p-)

vinyltoluene, (1-, 3- and 4-) vinyl-cyclohexenes and phenylcyclohexenes, as well as olefinic compounds carrying functional substituents, such as methyl methacrylate and methyl oleate.

Olefinic compounds containing more than 30 carbon atoms, especially macromolecular olefinic compounds, particularly polybutadiene and polyisoprene, can also be used.

The organic hydroperoxides which can be used as the epoxidising agent according to the invention generally have the formula $R^1OOH$, $R^1$ being an organic radical, the free valency of which is carried by a carbon atom. $R^1$ is more particularly of the aliphatic, cycloaliphatic or arylaliphatic type, the number of carbon atoms in it being generally from 3 to 30. These hydroperoxides can be primary, secondary or tertiary. $R^1$ can optionally contain ethylenic bonds, but hydroperoxides in which $R^1$ is either saturated or contains only aromatic unsaturated bonds are preferred. $R^1$ is more particularly an alkyl, cycloalkyl, aralkyl, aralkenyl, hydroxyaralkyl, cycloalkenyl or hydroxycycloalkyl radical.

As hydroperoxides which can be used, there may be mentioned more specifically cumyl hydroperoxide, tertiary butyl hydroperoxide, cyclohexyl hydroperoxide, methylcyclohexyl hydroperoxide, benzyl hydroperoxide and cyclohexenyl hydroperoxide, as well as the hydroperoxides derived from ethylbenzene, cyclohexanone (1-hydroxy-1-hydroperoxy-cyclohexane), tetralin, methyl ethyl ketone, methylcyclohexene, para-ethyltoluene, isobutylbenzene, diisopropylbenzene, p-isopropyltoluene, (o-, m- and p-) xylenes and phenylcyclohexane.

These hydroperoxides are generally employed in solution. They can then be either solutions of hydroperoxides which have been purified beforehand, or, more conveniently, crude solutions of hydroperoxides prepared by oxidising the corresponding hydrocarbon by means of air. This oxidation is usually carried out in the liquid phase, optionally in the presence of initiators and stabilisers for hydroperoxides, optionally under pressure, the temperature and the degree of conversion being chosen so as to limit the production of undesirable products to the maximum extent. The oxidation is generally limited such that the proportion of oxidation products in the solution is less than 40%, preferably from 2 to 30%. More specifically, it is known to prepare solutions containing a relatively high proportion of cyclohexyl hydroperoxide in cyclohexane. To do this, it has been recommended to carry out the oxidation of cyclohexane without a metal catalyst, to allow the reagents to have a very short dwell time in the oxidation apparatus, and to work at relatively low temperatures with low degrees of conversion and in an apparatus which does not catalyse the decomposition of hydroperoxides.

It has also been suggested to work in the presence of agents which sequester metals, or to treat, with a basic agent, the cyclohexane which is recycled to the oxidation zone.

The molar ratio of olefinic compound (in the dissolved liquid state) to hydroperoxide is generally from 0.5/1 to 500/1, and preferably from 2/1 to 50/1, assuming that the olefinic compound has only one double bond (in effect the ratio is an equivalent ratio, that is to say the actual number of mols multiplied by the number of double bonds per molecule).

The ratio of the number of mols of hydroperoxide to the number of gram atoms of tin in the catalyst is generally from 5 to 10,000, preferably from 50 to 1,000.

The epoxidation temperature is suitably from $-20°$ to $+200°$ C., generally from 0° to 160° C., preferably from 50° to 150° C. The temperature and pressures used should be chosen so that the reaction takes place essentially in the liquid phase; pressures from atmospheric pressure to 100 bars gauge are usually suitable.

The reaction mixture can optionally comprise a solvent; the use of a solvent is especially useful when the olefinic compound to be epoxidised is normally gaseous under the chosen pressure and temperature conditions. The solvent is preferably a solvent which is miscible with the olefinic compound to be epoxidised. As solvents which can be used, there may be mentioned organic liquids such as the saturated compounds corresponding to the olefinic compounds defined above which can be epoxidised, especially saturated hydrocarbons which are liquid under the reaction conditions, as well as substituted or unsubstituted aromatic hydrocarbons which are liquid under these same conditions. It is also possible to use the liquid hydrocarbons of the formula $R^1H$, corresponding to the hydroperoxide $R^1OOH$ being used.

Specific solvents which can be used include cyclohexane, benzene, chlorobenzene, ethylbenzene, n-octane, cumene and tetralin.

Improved results are often observed when the epoxidation is carried out in an inert atmosphere, that is to say in the absence of oxygen or at the very least in an atmosphere which is substantially devoid of oxygen. It is also possible to improve the yields of epoxide by working in the presence of various adjuvants. As adjuvants, there may be mentioned agents which inhibit free radicals such as, for example, [ionol (4-methyl-2, 6-di(tertiary butyl)-phenyl]; water may also be mentioned when it is present in small amounts, for example from 0.01% to 0.1% by weight.

The epoxidation reaction can be carried out continuously or discontinuously.

At the end of the reaction, the epoxide formed can be isolated from the reaction medium by any known means, in particular by distillation.

During the isolation of the epoxide, the catalyst sometimes undergoes degradation and/or chemical conversion; even if it is not converted, it is generally mixed with various compounds, especially with residues or by-products resulting from the epoxidation reaction, so that, in order to be able to re-use the catalyst in subsequent operations, it is necessary, or is at least very advantageous, to regenerate this catalyst from the reaction mixture obtained at the end of epoxidation.

Various processes for treating the reaction mixture and regenerating the catalyst also form part of the present invention; two processes, $P_1$ and $P_2$, will be described more specifically.

These two processes have in common the fact that they begin by preparing, in a first step, a residue, hereinafter called the "residue containing tin," this first step consisting of distilling the reaction mixture resulting from the epoxidation. In this first step, a simple and direct distillation of the reaction mixture can be involved, to yield, as the distillate, the olefine, the olefine oxide and, where present, the solvent. A more extensive distillation can also be involved, removing not only the olefine, the olefine oxide and the solvent, but also other constituents present in the mixture (either present prior to the epoxidation, or reaction by-products). As examples of such constituents to be removed, there may be mentioned alcohols and ketones (or aldehydes), including those formed during the epoxidation and those present with the hydroperoxide in the crude solutions resulting from the oxidation of hydrocarbons by means of air.

In every case, these distillations can also be carried out, not directly on the reaction mixture, but on mixtures of the reaction mixture with solutions obtained by releasing the gas present in the reactor into a solvent, that is to say solutions into which all or part of the reactor atmosphere has been bubbled in order to extract the valuable compounds therefrom, especially the olefine and the olefine oxide.

According to the first process $P_1$ for regenerating the catalyst, the residue containing tin is treated with a basic aqueous solution, the mixture is allowed to separate out, and the aqueous phase is isolated and treated with hydrochloric acid.

The basic aqueous solution is advantageously an alkaline aqueous solution, preferably of sodium hydroxide or potassium hydroxide, the molar amount of alkaline agent being, for example, from 2 to 20 times the number of gram atoms of tin present in the residue to be treated. The treatment of the residue containing tin with the basic aqueous solution is generally carried out at ambient temperature (15° to 25° C.) but can generally be carried out at 5° to 100° C. The treatment can consist of, for example, mixing the residue containing tin and the basic aqueous solution intimately, for example with stirring, or by washing in a column.

After the mixture has separated out, an aqueous solution is obtained which contains most of the tin in the form of a soluble derivative. The recovery of the tin can be completed by washing the organic phase resulting from the separation process again with water, and then combining the various aqueous phases.

The treatment with hydrochloric acid will now be described in more detail.

The aqueous solution containing tin is reacted with hydrochloric acid; the reaction temperature can, for example, be from 20° to 150° C., preferably from 50° C., to the boiling point of the mixture under atmospheric pressure. The amount of hydrochloric acid employed is generally from 1.2 to 10 times the amount of alkaline agent used in the preceding step. According to an advantageous method, the treatment with hydrochloric acid is carried out in the presence of an organic solvent of the same type as that used during the epoxidation, the water is then removed by distillation and a solution of tin-based catalyst ready for use is obtained. The use of an organic solvent which can form an azeotrope with water makes it possible to remove the latter more satisfactorily and to obtain a purer solution of tin-based catalyst. This solution of tin-based catalyst can, of course, be distilled in order to remove the solvent at least partially.

According to the second process $P_2$ for regenerating the catalyst, the residue containing tin is treated directly with an aqueous solution of hydrochloric acid, and then the mixture is allowed to separate out, the aqueous phase is isolated and the water is removed from this aqueous phase, for example by distillation.

The treatment with hydrochloric acid is generally carried out at a temperature from 10° to 150° C., preferably from 20° C., to the boiling point of the mixture at atmospheric pressure; the treatment may simply consist of a mixing operation. More precisely, the water can advantageously be removed from the aqueous phase by adding an organic solvent followed by distilling a solvent-water azeotrope.

In addition to the catalyst regeneration described above, the epoxidation process according to the present invention can be combined with other reactions. Thus the alcohol of formula $R^1OH$ formed as a by-product of the reaction from the hydroperoxide $R^1OOH$ can undergo hydrogenolysis to regenerate the hydrocarbon $R^1H$ intended to be converted again to the hydroperoxide $R^1OOH$. When the alcohol $R^1OH$ is secondary or primary, it can also be dehydrated to form an olefine; thus when epoxidation is carried out by means of ethylbenzene hydroperoxide, α-phenylethyl alcohol is formed and this can be dehydrated to yield styrene. Such processes for effecting hydrogenolysis and dehydration of alcohols are known.

In addition to the advantages outlined above, the epoxidation process of this invention also possesses other substantial advantages. Thus the good performance and the good yields of epoxides can be obtained without it being necessary to use large amounts of adjuvants or, indeed, adjuvants at all; furthermore, the process yields not only the epoxide but also an alcohol (and where appropriate a carbonyl compound such as a ketone) derived from the hydroperoxide, and does so in good yields. In view of this, the reaction described can advantageously be applied, for example to the simultaneous preparation of propylene oxide and cyclohexanol when the hydroperoxide used is cyclohexyl hydroperoxide, or to the preparation of propylene oxide and styrene when the hydroperoxide used is ethylbenzene hydroperoxide.

The following Examples further illustrate the present invention.

EXAMPLES 1 to 17

A series of experiments involving the epoxidation of olefines in liquid phase by means of an organic hydroperoxide is carried out in accordance with the following general procedure:

a liquid olefine or an olefine in solution, the catalyst and optionally a solvent are introduced into a 200 cm³ three-necked glass flask which is under an inert atmosphere (bubbling dry nitrogen) and is surmounted by a reflux condenser.

the mixture is adjusted to a temperature of $\theta°$ C., then the hydroperoxide is introduced and this temperature is maintained for a period of time $t$. At the end of the reaction, the epoxide formed as well as the hydroperoxide remaining are measured.

the condition characteristic of each Example and the results obtained are given in Table 1.

the letters RF which sometimes follow the temperature signify that the reaction mixture is refluxing at the temperature selected.

Y is the yield (expressed in %) of epoxide, calculated relative to the hydroperoxide which reacted.

DC is the degree of conversion (expressed in %) of the hydroperoxide employed.

the following abbreviations are used in Table 1:
  CHPO for cumyl hydroperoxide; CHHPO for cyclohexyl hydroperoxide;

EBHPO for ethylbenzyl hydroperoxide (formula: $C_6H_5$—$CH(CH_3)$—O—OH); octene for n-oct-1-ene; and octane for n-octane.

In Example 2, a 100% yield of dimethyl-phenylcarbinol relative to the hydroperoxide was obtained.

In Example 9, the water was removed in the form of an azeotrope as the reaction proceeded.

In Example 12, a 98% yield of cyclohexanol and a 2% yield of cyclohexanone relative to the hydroperoxide were obtained.

Preparation of specific catalysts

Catalyst of Example 11

20 cm³ of methanol and 0.93 g. of sodium are introduced into a 100 cm³ flask equipped with a reflux condenser.

The sodium dissolves and this solution is added slowly, with stirring, to a mixture of 25 cm³ of methanol and 11.3 g. of n—$C_4H_9SnCl_3$. Stirring is continued for 2 hours 40 minutes and the sodium chloride is then filtered off. The filtrate is evaporated at about 30° C., under an absolute pressure of 80 mm.Hg and then at 20° C., under 3 mm.Hg. 10.95 g. of a white solid of the formula n—$C_4H_9SnCl_2(OCH_3)$ are obtained - purity : approximately 80%.

Catalyst of Example 12

25 cm³ of $CCl_4$ and 5.64 g. of n—$C_4H_9SnCl_3$ are introduced into a 50 cm³ flask. 3.34 g. of silver acetate are added gradually and with stirring. The mixture is then heated at the boiling point and under reflux for 1 hour and then cooled and the silver chloride is filtered off. The filtrate is evaporated at 20° C., under 20 mm. of mercury (absolute pressure). 5.7 g. of residue are obtained, the infra-red band and NMR analyses of which correspond to the formula n—$C_4H_9SnCl_2(OCOCH_3)$.

This residue is involved in the epoxidation reaction.

Catalyst of Examples 13 and 16

0.15 g. (6.6 × 10⁻³ mols) of sodium are added to 10 cm³ of cyclohexanol heated to 100° C. This solution is added slowly with stirring to a mixture of 6.6 × 10⁻³ mols of $RSnCl_3$ in 6.7 cm³ of cyclohexanol (in Example 13, R = n—$C_4H_9$ and in Example 16, R = n—$C_8H_{17}$). Stirring is continued for 3 hours at a temperature of 35° C. Then cyclohexanol is distilled off at about 30° C., under an absolute pressure of 2 mm.Hg. A residue is obtained, the infra-red band, NMR and microanalyses of which correspond to the formula: $RSnCl_2(OC_6H_{11})$ — purity : approximately 50%.

This residue is used for the epoxidation reaction.

Catalyst of Example 14

1.15 g. (0.05 mols) of sodium are dissolved in 50 cm³ of 1-phenylethanol at a temperature of about 100° C. This solution is added with stirring to a solution of 14.1 g. (0.05 mols) of n-$C_4H_9SnCl_3$ in 50 cm³ of 1-phenylethanol. The mixture is stirred for 3 hours at 20° C. 1-Phenylethanol is then distilled off at 75° C., under an absolute pressure of 15 mm.Hg and finally under 1 mm.Hg.

50 cm³ of $CCl_4$ are added to the distillate and sodium chloride is filtered off. The filtrate is evaporated under 20 mm.Hg (absolute pressure).

10.7 g. of residue are obtained, the infra-red band and NMR analyses of which correspond to the formula:

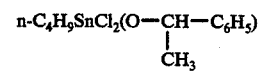

purity: approximately : 50%.

Catalyst of Example 15

120 cm³ of $CCl_4$ and 14.1 g. (0.05 mols) of n—$C_4H_9SnCl_3$ are introduced into a 250 cm³ flask equipped with a reflux condenser.

7.2 g. (0.05 mols) of sodium benzoate are slowly (in 30 minutes) added with stirring and the mixture is heated at the boiling point under reflux for 1 hour and then cooled.

Sodium chloride is then centrifuged off. The remaining solution is then evaporated for 2 hours at 20° C., under 2 mm.Hg (absolute pressure).

A residue is obtained, the analyses of which correspond to the formula : n—$C_4H_9SnCl_2(O - CO - C_6H_5)$.

purity : approximately 45%.

This residue is used for the epoxidation reaction.

Catalyst of Example 17

The procedure of Example 11 is repeated, but using the equivalent molar quantity of n—$C_8H_{17}SnCl_3$ instead of n—$C_4H_9SnCl_3$.

TABLE I

| | OLEFINE | | SOLVENT | | HYDROPEROXIDE | |
|---|---|---|---|---|---|---|
| Ex. | Nature | Quantity in mols | Nature | Quantity in mols | Nature | Quantity in mols |
| 1 | octene | 0.7 | octane | 0.1 | CHHPO | 0.04 |
| 2 | octene | 0.7 | octane | 0.1 | CHPO | 0.04 |
| 3 | octene | 0.7 | octane | 0.2 | CHHPO | 0.04 |
| 4 | octene | 0.7 | octane | 0.2 | EBHPO | 0.04 |
| 5 | octene | 0.7 | octane | 0.1 | CHHPO | 0.04 |
| 6 | octene | 0.7 | octane | 0.1 | CHHPO | 0.04 |
| 7 | cyclohexene | 0.8 | none | — | CHHPO | 0.04 |
| 8 | cyclohexene | 0.7 | none | — | CHHPO | 0.04 |
| 9 | styrene | 0.5 | cyclohexane | 2.5 | CHHPO | 0.05 |
| 10 | n-hex-1-ene | 0.5 | chlorobenzene | 0.15 | CHHPO | 0.02 |
| 11 | octene | 0.7 | octane | 0.1 | CHHPO | 0.04 |
| 12 | octene | 0.7 | octane | 0.1 | CHHPO | 0.04 |
| 13 | octene | 0.7 | octane | 0.1 | CHHPO | 0.04 |
| 14 | octene | 0.7 | octane | 0.1 | CHHPO | 0.04 |
| 15 | octene | 0.7 | octane | 0.1 | CHHPO | 0.04 |
| 16 | octene | 0.7 | octane | 0.1 | CHHPO | 0.04 |
| 17 | octene | 0.7 | octane | 0.1 | CHHPO | 0.04 |

| | CATALYST | | RESULTS | | | |
|---|---|---|---|---|---|---|
| Ex. | Formula | Quantity in mols | Duration in mins | Temp. 74 in ° C | D.C. in % | Yield in % |
| 1 | $CH_3SnCl_3$ | 4 . 10⁻⁴ | 60 | 121 RF | 100 | 78 |
| 2 | n-$C_4H_9SnCl_3$ | 4 . 10⁻⁴ | 85 | 121 RF | 100 | 86 |

TABLE I-continued

| | | | | | | |
|---|---|---|---|---|---|---|
| 3 | n-$C_8H_{17}SnCl_3$ | $1.6 \cdot 10^{-3}$ | 90 | 110 | 100 | 82 |
| 4 | n-$C_8H_{17}SnCl_3$ | $1.6 \cdot 10^{-3}$ | 90 | 110 | 100 | 86 |
| 5 | $CH_2=CH\text{-}SnCl_3$ | $4 \cdot 10^{-4}$ | 60 | 121 RF | 85 | 55 |
| 6 | $C_6H_5SnCl_3$ | $4 \cdot 10^{-4}$ | 64 | 121 RF | 98 | 64 |
| 7 | n-$C_8H_{17}SnCl_3$ | $1.6 \cdot 10^{-3}$ | 18 | 82 RF | 100 | 61.2 |
| 8 | n-$C_8H_{17}SnCl_3$ | $4 \cdot 10^{-4}$ | 30 | 82 RF | 99 | 87 |
| 9 | n-$C_8H_{17}SnCl_3$ | $2 \cdot 10^{-3}$ | 200 | 87 RF | 80 | 54.7 |
| 10 | n-$C_8H_{17}SnCl_3$ | $1.6 \cdot 10^{-3}$ | 270 | 72 RF | 89.4 | 64.2 |
| 11 | n-$C_4H_9SnCl_2(OCH_3)$ | $4 \cdot 10^{-4}$ | 60 | 121 RF | 96.4 | 86 |
| 12 | n-$C_4H_9SnCl_2(OCCH_3)$<br>$\qquad\qquad\qquad\;\;\parallel$<br>$\qquad\qquad\qquad\;\;O$ | $4 \cdot 10^{-4}$ | 30 | 121 RF | 100 | 92 |
| 13 | n-$C_4H_9SnCl_2(OC_6H_{11})$ | $4 \cdot 10^{-4}$ | 60 | 121 RF | 89.2 | 83.8 |
| 14 | n-$C_4H_9SnCl_2(O\text{—}CH\text{—}C_6H_5)$<br>$\qquad\qquad\qquad\quad\;\;\vert$<br>$\qquad\qquad\qquad\quad\;\;CH_3$ | $4 \cdot 10^{-4}$ | 300 | 121 RF | 79.9 | 57.2 |
| 15 | n-$C_4H_9SnCl_2(O\text{—}C\text{—}C_6H_5)$<br>$\qquad\qquad\qquad\quad\;\;\parallel$<br>$\qquad\qquad\qquad\quad\;\;O$ | $4 \cdot 10^{-4}$ | 50 | 121 RF | 99.5 | 83 |
| 16 | n-$C_8H_{17}SnCl_2(OC_6H_{11})$ | $4 \cdot 10^{-4}$ | 70 | 121 RF | 99 | 92 |
| 17 | n-$C_8H_{17}SnCl_2(OCH_3)$ | $4 \cdot 10^{-4}$ | 60 | 121 RF | 98 | 91 |

EXAMPLES 18 to 24

The solvent, 6.7 millimoles of hydroperoxide, the catalyst and optionally an additive are introduced into a 50 cm³ autoclave made of titanium. The autoclave is purged with nitrogen and closed and then 0.167 mol of propylene is introduced.

The autoclave is immersed in a thermostatically controlled oil bath, and shaken. After cooling, the reaction mixture is transferred into cyclohexane and then the gases present in the reactor are released and are bubbled into the solution thus prepared. The propylene oxide formed is then measured.

The conditions characteristic of each experiment and the results obtained are indicated in Table 2.

EXAMPLE 25

Ethylene is epoxidised in accordance with the process of Examples 18 to 22 and under the following conditions:

- hydroperoxide : 0.0111 mol of t-BuHPO
- catalyst : 111 micromols of n-$C_4H_9SnCl_3$
- ethylene : 0.232 mol
- solvent : 0.192 mol of benzene
- temperature : 128° C.
- duration : 90 minutes
- result : degree of conversion of the hydroperoxide : 56.6%
  Yield of epoxide relative to the hydroperoxide converted : 24.2%.

TABLE II

| | SOLVENT | | HYDRO-PEROXIDE | CATALYST | | ADDITIVES | | Duration in minutes | θ° C | DC in % | Yield in % |
|---|---|---|---|---|---|---|---|---|---|---|---|
| Ex | Nature | Amount in mols | | Formula | Amount in micromols | Nature | Amount in micromols | | | | |
| 18 | Ethylbenzene | 0.14 | EBHPO | n-$C_4H_9SnCl_3$ | 67 | — | 0 | 90 | 128 | 91.3 | 94 |
| 19 | Benzene | 0.195 | t-BuHPO | n-$C_4H_9SnCl_3$ | 67 | ionol | 6.7 | 180 | 150 | 98.3 | 81.5 |
| 20 | Cyclohexane | 0.1585 | CHHPO | n-$C_4H_9SnCl_3$ | 67 | ionol | 67 | 90 | 128 | 91 | 95.5 |
| 21 | Cyclohexane | 0.1585 | CHHPO | n-$C_4H_9SnCl_3$ | 67 | $H_2O$ | 600 | 90 | 128 | 90.7 | 92.4 |
| 22 | Cyclohexane | 0.1585 | CHHPO | n-$C_4H_9SnCl_3$ | 6.7 | — | 0 | 240 | 150 | 93 | 53.3 |
| 23 | Cyclohexane | 0.1585 | CHHPO | n-$C_4H_9SnCl_3$ | 67 | — | 0 | 90 | 128 | 95.6 | 85.1 |
| 24 | Cyclohexane | 0.1585 | CHHPO | n-$C_4H_9SnCl_3$ | 67 | — | 0 | 60 | 150 | 99.2 | 77.3 | t-BuHPO denotes tertiary butyl hydroperoxide

For some of the experiments given in this Table (II), the yields of alcohol and ketone formed during the reaction were also determined, these yields being calculated from the hydroperoxide converted.

TABLE (III)

| | ALCOHOL | | KETONE | |
|---|---|---|---|---|
| Ex. | Nature | Yield in % | Nature | Yield in % |
| 18 | $C_6H_5$—CHOH—$CH_3$ | 93 | $C_6H_5$—CO—$CH_3$ | 4.6 |
| 21 | Cyclohexanol | 93.3 | Cyclohexanone | 5.2 |
| 23 | Cyclohexanol | 90.2 | Cyclohexanone | 2.9 |
| 24 | Cyclohexanol | 90.5 | Cyclohexanone | 5.3 |

This Table (III) shows that the sum of the yields of alcohol and ketone is approximately 100%.

EXAMPLE 26

Butadiene is epoxidised in accordance with the process of Examples 18 to 24 and under the following conditions:

- hydroperoxide : 6.7 millimols of CHHPO
- catalyst : 67 micromols of n-$C_4H_9SnCl_3$
- butadiene : 0.13 mol
- solvent : 0.195 mol of benzene
- temperature : 128° C.
- duration : 1 hour 30 minutes
- result : degree of conversion of hydroperoxide : 100%.
  Yield (of epoxybutene relative to the hydroperoxide converted) : 91%.

EXAMPLE 27

14.12 g. of a crude solution of cyclohexyl hydroperoxide originating from the oxidation of cyclohexane by means of air without a catalyst, followed by washing with water and then washing with a solution of sodium bicarbonate (the effect of these washings are to remove the organic acids which may be present) are placed in a 50 cm$^3$ autoclave made of titanium.

The said crude solution contains 6.7 millimols of CHHPO, 0.2836 g. of cyclohexanol and 0.072 g. of cyclohexanone. 67 Micromols of n-C$_4$H$_9$SnCl$_3$ are added. The atmosphere of the reactor is flushed out with nitrogen, the autoclave is closed and 7 g. of propylene are introduced. The mixture is heated at 128° C. for 90 minutes with stirring. Propylene oxide is obtained in a yield of 73.2% relative to the hydroperoxide converted and the degree of conversion of the hydroperoxide is 88.7%.

EXAMPLE 28

Example 21 is repeated, but in the absence of water. Propylene oxide is obtained in a yield of 84% relative to the hydroperoxide converted and the degree of conversion of the CHHPO is 94%.

At the end of the reaction, the pressure acting inside the reactor is released and its atmosphere is bubbled into 100 g. of cyclohexane to which the liquid reaction mixture from the reactor (prior to releasing the pressure therein) has been added. The whole is distilled so as to drive off the propylene oxide and most of the cyclohexane. A "residue containing tin" weighing 26.8 g. is thus obtained as the residue after distillation. This residue consists essentially of cyclohexane, cyclohexanol, cyclohexanone and the tin derivative. 4 cm$^3$ of a decinormal aqueous solution of sodium hydroxide are added to this residue containing tin, the mixture is stirred and allowed to separate out and the aqueous phase is isolated; the organic phase is also washed twice with 2 cm$^3$ of water each time and the three aqueous phases obtained are combined; this combination of three aqueous phases is further washed with 10 cm$^3$ of cyclohexane in order to remove therefrom the cyclohexanol and cyclohexanone which may be present.

6 cm$^3$ of a decinormal aqueous solution of hydrochloric acid, 30 cm$^3$ of cyclohexane and the combination of the three washed aqueous phases obtained above are introduced into a 100 cm$^3$ three-necked flask equipped with a reflux condenser.

The mixture is heated under reflux, the water-cyclohexane azeotrope is distilled, this distillate is allowed to separate out as it is formed and the organic phase (cyclohexane) is reintroduced into the flask. When all the water has been removed in the form of the azeotrope, the cyclohexane is distilled until the distillation residue is brought to a weight of 3.4 g.: this is a residue which can be used directly as the catalyst and consists essentially of a solution of n—C$_4$H$_9$SnCl$_3$ in cyclohexane.

This regenerated solution of catalyst is used to carry out a second epoxidation operation under the same conditions as the first (except, of course, that instead of the 67 micromols of n—C$_4$H$_9$SnCl$_3$, the solution of regenerated catalyst is used).

Propylene oxide is obtained in a yield of 87% relative to the hydroperoxide converted and the degree of conversion is 91%.

EXAMPLE 29

Example 21 is repeated but in the absence of water. Propylene oxide is obtained in a yield of 84% relative to the hydroperoxide converted and the degree of conversion of the hydroperoxide is 94%.

At the end of the reaction, the liquid reaction mixture is transferred into 100 g. of cyclohexane and then the pressure acting inside the reactor is released by bubbling the atmosphere of the said reactor into this mixture. The whole is distilled so as to drive off the propylene oxide and most of the cyclohexane. A "residue containing tin" weighing 20.2 g. is thus obtained as the residue after distillation. 2 cm$^3$ of a decinormal aqueous solution of hydrochloric acid are added to this residue containing tin. The mixture is stirred at ambient temperature (20° C.) and is allowed to separate out, and the aqueous phase is isolated. The organic phase is washed twice with 2 cm$^3$ of water each time. The three aqueous phases are combined and washed with 3 cm$^3$ of cyclohexane (the mixture is allowed to separate out and the organic phase is removed).

The combination of the three aqueous phases which have been combined and washed with cyclohexane, and 40 cm$^3$ of cyclohexane are introduced into a 100 cm$^3$ three-necked flask equipped with a reflux condenser.

The mixture is heated under reflux, the water-cyclohexane azeotrope is distilled, this distillate is allowed to separate out as it is formed and the organic phase (cyclohexane) is reintroduced into the flask. Then, when all the water has been removed in the form of the azeotrope, the cyclohexane is distilled until the distillation residue is brought to a weight of 2.6 g.: this is a residue which can be used directly as the catalyst and consists essentially of a solution of n—C$_4$H$_9$SnCl$_3$ in cyclohexane.

This solution of regenerated catalyst is used to carry out a second epoxidation operation under the same conditions as the first (except, of course, that instead of the 67 micromols of n—C$_4$H$_9$SnCl$_3$, the solution of regenerated catalyst is used).

Propylene oxide is obtained in a yield of 86.4% relative to the hydroperoxide converted and the degree of conversion is 89.1%.

EXAMPLE 30

Preparation of the catalyst 2.82 g. of n—C$_4$H$_9$SnCl$_3$ in 4 g. of n-octane are introduced into a 50 cm$^3$ flask equipped with a reflux condenser, a dropping funnel and a stirrer. The whole is cooled to +10° C., and 1.35 g. of 1,2-epoxy-octane (of purity 93%) are run in gradually over the course of 30 minutes. The temperature is allowed to rise to 20° C., and the mixture is allowed to stand for 12 hours and is then heated at 70° C., for 30 minutes.

A solution of a mixture of

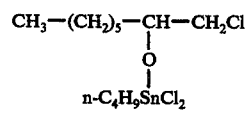

and of CH$_3$ — (CH$_2$)$_5$ — CHCl — CH$_2$ — O — SnCl$_2$ — n—C$_4$H$_9$ in cyclohexane was thus obtained.

Expoxidation 0.7 Mol of n-oct-1-ene, 0.1 mol of octane and 0.38 g. of the catalyst solution prepared above (corresponding to 0.4 millimol of tin) are introduced into a 200 cm³ glass flask which is under an inert atmosphere and is surmounted with a reflux condenser.

The mixture is heated to 121° C. (reflux), 0.04 mol of CHHPO is added and the temperature is maintained for 20 minutes. The hydroperoxide is then completely converted.

Epoxidation yield: 93.3%.

EXAMPLES 31 to 33

Catalysts are prepared according to the following general procedure.

Preparation of the catalysts 0.05 Mols of a R SnCl₃ compound in solution in 50 cm³ of CCl₄ are introduced into a 100 cm³ three-necked glass flask which is surmounted by a reflux condenser. The mixture is cooled to +10° C., and 0.05 mols of an epoxide of the formula

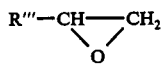

in 10 cm³ of CCl₄ are added slowly with stirring in about 20 minutes.

A temperature of 25° C., is maintained, and stirring is continued for 2 hours.

The mixture is then heated at the boiling point and under reflux for 10 minutes.

CCl₄ is then distilled off at about 30° C., under 35 mm.Hg and then under 0.5 mm.Hg (absolute pressures).

A residue is obtained, the infra-red band, NMR and microanalyses of which correspond to the formula:

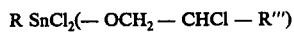

and

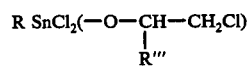

purity: about 100%.

This residue is used directly for the epoxidation reaction.

Epoxidation 0.7 Mol of n-oct-1-ene, 0.1 mol of octane and 4.10⁻⁴ mol of the residue prepared above are introduced into a 250 cm³ three-necked flask which is kept under an inert atmosphere and is surmounted by a reflux condenser.

The mixture is heated to 121° C. (reflux), 0.04 mol of CHHPO is added and the temperature is maintained for 30 minutes.

The conditions and the results obtained are given in Table IV.

TABLE (IV)

| Ex. | R | R''' | DC in % | Yield in % |
|-----|------|------|---------|------------|
| 31 | C₄H₉ | CH₃ | 98.6 | 91 |
| 32 | C₈H₁₇ | CH₃ | 98.7 | 89.7 |
| 33 | C₈H₁₇ | C₆H₅ | 94.5 | 90 |

EXAMPLE 34

1.4 Mols of cyclohexene, 0.5 mol of cyclohexane and 0.4 millimol of trichloro-butyl-tin are introduced into a 200 cm³ three-necked glass flask which is kept under an inert atmosphere and surmounted by a reflux condenser.

The mixture is heated to the reflux temperature (82° C.), then 0.08 mol of CHHPO is introduced and this temperature is maintained for 45 minutes.

Degree of conversion of the hydroperoxide: 92.6%.
Yield of epoxide: 90.7% (yield relative to the hydroperoxide converted).
Yield of cyclohexanol: 96.5%.
Yield of cyclohexanone: 2%.

EXAMPLE 35

Example 2 is repeated, but benzyl hydroperoxide is used (instead of cumyl hydroperoxide) and the mixture is heated for 45 minutes (instead of 85 minutes).

Degree of conversion of the hydroperoxide: 100%.
Yield of epoxide: 73%.
Yield of benzyl alcohol: 95%.
Yield of benzaldehyde: 5%.

EXAMPLE 36

12.4 g. of a solution in ethylbenzene containing:
1.2242 g. of ethylbenzene hydroperoxide and
0.0892 g. of $C_6H_5 — CHOH — CH_3$ and
0.119 g. of acetophenone, and
0.0255 g. of n—$C_4H_9SnCl_3$
are introduced into a 50 cm³ autoclave of titanium.

The autoclave is purged with nitrogen and closed and 9.6 g. of propylene are introduced. The mixture is heated to 130° C. for 90 minutes. After the treatments of the preceding Examples, the following results are obtained:

Degree of conversion of the hydroperoxide: 96.9%.
Yields relative to the hydroperoxide converted:
epoxide: 86.4%.
$C_6H_5 — CHOH — CH_3$: 94.7% and
$C_6H_5 — CO — CH_3$: 5.1%.

EXAMPLES 37 to 39

In order to illustrate the advantages of the process of the present invention, runs were carried out comparing catalysts of this invention with the $(C_6H_5)_3SnOH$ taught in British Patent Specification No. 1,276,637, and comparing the organic hydroperoxides of this invention with hydrogen peroxide and with oxygen, using catalysts of this invention.

EXAMPLE 37

Following the conditions of Example 23 runs were made with 67 micromols of $(C_6H_5)_3SnOH$ as catalyst (a) and with (67 × 10) micromols of the same catalyst (b).

The results are as follows:

|       | DC in % | Yield in % |
|-------|---------|------------|
| a     | 36.6    | 27.8       |
| b     | 59      | 27.6       |
| Ex 23 | 95.6    | 85.1       |

These runs demonstrate the greater efficiency of the catalysts of the present invention.

EXAMPLE 38

Following the operating conditions of Example 2, a run was made using hydrogen peroxide instead of cumyl hydroperoxide:

In a 200 cm³ three-necked flask equipped with a reflux condenser and a dropping funnel was charged, under a nitrogen atmosphere, 1-octene = 0.7 mol (78.4 g.)
octane = 0.1 mol (11.4 g.)
n—BuSnCl$_3$ = 4 × 10$^{-4}$ mols (0.113 g.).

The mixture was brought to the reflux temperature (121° C.). Over about 1 minute, 0.04 mol of hydrogen peroxide were added watching the exothermicity of the reaction. After 85 minutes, the mixture was cooled.

It was found that the degree of conversion of the H$_2$O$_2$ was 96.8% but that the yield of epoxide was less than 1%.

This run demonstrates the ineffectiveness of hydrogen peroxide in epoxidation using the catalysts of the present invention and establishes that organic hydroperoxides together with hydrogen peroxide behave fundamentally differently in such epoxidations.

EXAMPLE 39

Following the operating conditions of Example 2, a run was made using molecular oxygen instead of cumyl hydroperoxide.

In a three-necked flask, equipped with an air inlet, a reflux condenser and a flow meter was charged:

1-octene = 0.7 mol (78.4 g.)
octane = 0.1 mol (11.4 g.)
n—BuSnCl$_3$ = 4 × 10$^{-4}$ mols (0.113 g.).

The mixture was brought to the reflux temperature (121° C.) and the mixture was then aerated at the rate of 50 liters/hour for 85 minutes. The mixture was then cooled.

Only traces of epoxide could be found.

This run demonstrates the ineffectiveness of molecular oxygen in epoxidation using the catalysts of the present invention and establishes that organic hydroperoxides together with oxygen behave fundamentally differently in such epoxidations.

We claim:

1. Process for the catalytic epoxidation of an olefinic compound in the liquid phase which comprises treating the compound with an organic hydroperoxide in the liquid phase in the presence of a tin catalyst of the formula:

$$RR'SnCl_2 \qquad (I)$$

in which:

R is a wholly aliphatic or cycloaliphatic or aromatic, or mixed aliphatic/aromatic, aliphatic/cycloaliphatic or cycloaliphatic/aromatic, linear or branched, saturated or unsaturated monovalent hydrocarbon radical containing at most 20 carbon atoms, and R' is selected from the group consisting of chlorine and monovalent organic radicals of the formula:

$$R'' - Y \qquad (II)$$

in which:

Y represents an oxygen atom, or a (—O—O—) group, or a carbonyloxy group (—CO—O—), the radical R" being attached to the carbon atom of (—CO—O—), R" is as defined under R and may be identical or different to R.

2. A process for the catalytic epoxidation of an olefinic compound in the liquid phase, comprising:

treating the olefinic compound with an organic hydroperoxide in the liquid phase in the presence of a tin catalyst of the formula:

$$RR'SnCl_2 \qquad (I)$$

in which:

R is a wholly aliphatic or cycloaliphatic or aromatic, or mixed aliphatic/aromatic, aliphatic/cycloaliphatic or cycloaliphatic/aromatic, linear or branched, saturated or unsaturated monovalent hydrocarbon radical containing at most 20 carbon atoms and R is unsubstituted or is substituted by chlorine, R' is selected from the group consisting of chlorine and monovalent organic radicals of the formula:

$$R'' - Y \qquad (II)$$

Y represents an oxygen atom, or a (—O—O—) group, or a carbonyloxy group (—CO—O—), the radical R" being attached to the carbon atom of (—CO—O—), R" is as defined under R and may be identical or different to R.

3. Process according to claim 1 in which R is an alkylaryl or aralkyl radical.

4. Process according to claim 1, in which R' is chlorine.

5. Process according to claim 4, in which R is selected from the group consisting of methyl, ethyl, n-propyl, isopropyl, n-butyl, isobutyl, n-pentyl, n-hexyl, n-octyl, lauryl, vinyl and phenyl radicals.

6. Process according to claim 5, in which R is butyl.

7. Process according to claim 4, in which R is selected from cyclopropyl, phenylethyl and cyclohexyl radicals.

8. Process according to claim 1, in which R' is a monovalent organic radical of the formula R" — Y, in which Y is a carbonyloxy group (—CO—O—), the radical R" being attached to the carbon atoms of (—CO—O—).

9. Process according to claim 8, in which the catalyst is in the form of a reaction product obtained by reacting a compound of formula RSnCl$_3$ with a carboxylate of formula R"COOM, in stoichiometric proportions or in up to about 20 mol % from stoichiometric proportions, in a solvent therefor, at a temperature from 0° to 120° C, M being selected from the group consisting of sodium, potassium, and silver; R being selected from the group consisting of methyl, ethyl, n-propyl, isopropyl, n-butyl, isobutyl, n-pentyl, n-hexyl, n-octyl, lauryl, vinyl and phenyl radicals, and R" being as defined under R, and is the same as or different from R.

10. Process according to claim 9, in which R is n-butyl.

11. Process according to claim 9, in which R" is selected from the group consisting of methyl and phenyl radicals.

12. Process according to claim 8 in which the catalyst is in the form of a reaction product obtained by reacting a compound of formula RSnCl$_3$ with a carboxylate of formula R"COOM, in stoichiometric proportions or in up to about 20 mol % from stoichiometric proportions, in a solvent therefor, at a temperature from 0° to 120° C, M being selected from the group consisting of sodium, potassium, and silver; and R and R" are each independently selected from the group consisting of methyl, ethyl, n-propyl, isopropyl, n-butyl, isobutyl, n-pentyl, n-hexyl, n-octyl, lauryl, vinyl, cyclopropyl, phenylethyl, cyclohexyl and phenyl radicals.

13. Process according to claim 1, in which R' is a monovalent radical of the formula R" — Y, in which Y is an oxygen atom.

14. Process according to claim 13, in which the catalyst is in the form of a reaction product obtained by reacting a compound of formula $RSnCl_3$ with an alcoholate of formula R"OM, in stoichiometric proportions or in up to about 20 mol % from stoichiometric proportions, in a solvent therefor at a temperature from 0° to 120° C, M being selected from the group consisting of sodium, potassium, and silver; R being as defined in claim 5 and R" being as defined under R and is the same as or different from R.

15. Process according to claim 14, in which R is selected from the group consisting of n-butyl and n-octyl radicals.

16. Process according to claim 13, in which the catalyst is in the form of a reaction product obtained by reacting a compound of formula $RSnCl_3$ with an alcoholate of formula R"OM, in stoichiometric proportions or in up to about 20 mol % from stoichiometric proportions, in a solvent therefor at a temperature from 0° to 120° C, M being selected from the group consisting of sodium, potassium, and silver; R being as defined in claim 5 or is a phenylethyl or cyclohexyl radical, and R" being as defined under R and is the same as or different from R.

17. Process according to claim 13, in which the catalyst is in the form of a reaction product obtained by reacting a compound of formula $RSnCl_3$ with an epoxide of formula

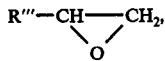

in a solvent therefor, at a temperature from 0° to 120° C., R being selected from the group consisting of methyl, ethyl, n-propyl, isopropyl, n-butyl, isobutyl, n-pentyl, n-hexyl, n-octyl, lauryl, vinyl and phenyl radicals, and R'" being a monovalent organic radical having at most 20 carbon atoms.

18. Process according to claim 17, in which R is selected from the group consisting of n-butyl and n-octyl radicals.

19. Process according to claim 17, in which R'" is methyl.

20. Process according to claim 1, in which the olefinic compound is an aliphatic, arylaliphatic or alicyclic olefine, optionally substituted by at least one ester, ketone = or ether group.

21. Process according to claim 20, in which the olefinic compound has 2 to 30 carbon atoms.

22. Process according to claim 21, in which the olefinic compound is ethylene, propylene, (1- and 2-) n-butenes, isobutene, isoprene, (1- and 2-) pentenes, methylpentenes, (1-, 2- and 3-) n-hexenes, (1- and 2-) octenes, (1- and 2-) dodecenes, cyclohexene, butadiene, styrene, α-methylstyrene, (1-, 3- and 4-) methyl-cyclohexenes, (o-, m- and p-) vinyltoluenes, (1-, 3- and 4-) vinylcyclohexenes, phenylcyclohexenes, methyl methacrylate and methyl oleate.

23. Process according to claim 1, in which the hydroperoxide has the formula $R^1OOH$, $R^1$ being an organic radical, the free valency of which is carried by a carbon atom and which is aliphatic, cycloaliphatic or arylaliphatic, the radical containing 3 to 30 carbon atoms.

24. Process according to claim 23, in which the hydroperoxide is cumyl hydroperoxide, tertiary butyl hydroperoxide, cyclohexyl hydroperoxide, methylcyclohexyl hydroperoxide, benzyl hydroperoxide or cyclohexenyl hydroperoxide, or the hydroperoxide derived from ethylbenzene, cyclohexanone, tetralin, methyl ethyl ketone, methylcyclohexene paraethyltoluene, isobutylbenzene, diisopropylbenzene, paraisopropyltoluene, (o-, m- and p-) xylenes or phenylcyclohexane.

25. Process according to claim 23, in which the hydroperoxide is used in the form of a crude solution obtained by oxidising the corresponding hydrocarbon by means of air.

26. Process according to claim 1, in which the molar ratio olefinic compound (in the dissolved or liquid state) hydroperoxide is from 0.5/1 to 500/1.

27. Process according to claim 26, in which the said ratio is from 2/1 to 50/1.

28. Process according to claim 1, in which the ratio of the number of mols of hydroperoxide to the number of gram atoms of tin in the catalyst is from 5 to 10,000.

29. Process according to claim 28, in which the ratio is from 50 to 1,000.

30. Process according to claim 1, in which the treatment is carried out at a temperature from 0° to 160° C.

31. Process according to claim 30, in which the temperature is from 50° to 150° C.

32. Process according to claim 1, in which the reaction is carried out at a pressure from atmospheric pressure to 100 bars gauge.

33. Process according to claim 1, in which the reaction is carried out in the presence of a solvent.

34. Process according to claim 33, in which the solvent is a hydrocarbon of the formula $R^1H$, $R^1OOH$ being the hydroperoxide used.

35. Process according to claim 33, in which the solvent is cyclohexane, benzene, chlorobenzene, ethylbenzene, n-octane, cumene or tetralin.

36. Process according to claim 1, in which the epoxidation is carried out in an inert atmosphere.

37. Process according to claim 1, in which the reaction is carried out in the presence of a free radical inhibitor.

38. Process according to claim 37, in which the reaction is carried out in the presence of ionol.

39. Process according to claim 1, in which the reaction is carried out in the presence of 0.01% to 1% by weight of water.

40. Process according to claim 1 in which at the end of the reaction, the catalyst is regenerated.

41. Process according to claim 40 in which the catalyst is regenerated by distilling the reaction mixture resulting from the epoxidation to provide a residue containing tin, treating said residue with a basic aqueous solution, isolating the aqueous phase which separates out and treating said aqueous phase with hydrochloric acid.

42. Process according to claim 41 in which the basic aqueous solution is an aqueous solution of sodium hydroxide or potassium hydroxide.

43. Process according to claim 41 in which the base is used in an amount from 2 to 20 times the number of gram atoms of tin present and the treatment is carried out at a temperature from 5° to 100° C.

44. Process according to claim 41 in which the aqueous phase is treated with hot aqueous hydrochloric acid.

45. Process according to claim 44 in which the treatment is carried out at a temperature from 50° C to the boiling point of the mixture under atmospheric pressure and the hydrochloric acid is used in an amount from 1.2 to 10 times the quantity of base.

46. Process according to claim 40 in which the catalyst is regenerated by distilling the reaction mixture resulting from the epoxidation to provide a residue containing tin and treating this residue directly with an aqueous hydrochloric acid solution.

47. Process according to claim 46 in which the treatment is carried out at a temperature from 20° C to the boiling point of the mixture at atmospheric pressure.

48. In a process for the catalytic epoxidation of an olefinic compound in the liquid phase with an organic hydroperoxide in the liquid phase in the presence of a metal catalyst, and which may include a solvent selected from saturated liquid hydrocarbons corresponding to the olefinic compound, liquid hydrocarbons corresponding to the hydroperoxide used, and substituted and unsubstituted liquid aromatic hydrocarbons, wherein the improvement comprises selecting said metal catalyst from organotin compounds of the formula:

$$RR'SnCl_2 \tag{I}$$

in which:
R is a wholly aliphatic or cycloaliphatic or aromatic, or mixed aliphatic/aromatic, aliphatic/cycloaliphatic or cycloaliphatic/aromatic, linear or branched, saturated or unsaturated monovalent hydrocarbon radical containing at most 20 carbon atoms, and
R" is selected from the group consisting of chlorine and monovalent organic radicals of the formula:

$$R'' - Y \tag{II}$$

in which:
Y represents an oxygen atom, or a (—O—O—) group, or a carbonyloxy group (—CO—O—), the radical R" being attached to the carbon atom of (—CO—O—), and
R" is as defined under R and may be identical or different to R.

49. A process according to claim 2 in which the tin catalyst is $RSnCl_3$.

50. A process for the catalytic epoxidation of an olefinic compound in the liquid phase which comprises treating the compound with an organic hydroperoxide in a liquid solvent selected from saturated liquid hydrocarbons corresponding to the hydroperoxide used, and substituted and unsubstituted liquid aromatic hydrocarbons, in the presence of a tin catalyst of the formula:

$$RR'SnCl_2 \tag{I}$$

in which:
R is wholly aliphatic or cycloaliphatic or aromatic, or mixed aliphatic/aromatic, aliphatic/cycloaliphatic or cycloaliphatic/aromatic, linear or branched, saturated or unsaturated monovalent hydrocarbon radical containing at most 20 carbon atoms, and
R' is selected from the group consisting of chlorine and monovalant organic radicals of the formula:

$$R'' - Y \tag{II}$$

in which:
Y represents an oxygen atom, or a (—O—O—) group, or a carbonyloxy group (—CO—O—), the radical R" being attached to the carbon atom of (—CO—O—),
R" is as defined under R and may be identical or different to R.

51. Process according to claim 13 in which R" is a methyl radical.

52. Process according to claim 8 in which the tin catalyst has the formula:

$$R(R''O)SnCl_2$$

in which R and R" are alkyl radicals each containing from 1 to 12 carbon atoms.

53. Process according to claim 13 in which the tin catalyst has the formula:

$$R(R''—COO)SnCl_2$$

in which R and R" are alkyl radicals each containing from 1 to 12 carbon atoms.

* * * * *